(12) United States Patent  
Lee

(10) Patent No.: US 6,494,111 B1
(45) Date of Patent: Dec. 17, 2002

(54) CHANGE LEVER MECHANISM OF A VEHICLE HAVING VIBRATION ABSORBER

(75) Inventor: Yang-Soo Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/441,991

(22) Filed: Nov. 18, 1999

(30) Foreign Application Priority Data

Jan. 18, 1999 (KR) .............................................. 99-1310

(51) Int. Cl.[7] .......................... F16H 59/04; F16H 63/38
(52) U.S. Cl. ............................... 74/473.27; 74/473.29; 74/473.33; 74/527
(58) Field of Search .................. 74/473.27, 473.29, 74/473.33, 473.34, 473.35, 527

(56) References Cited

U.S. PATENT DOCUMENTS

| 2,529,741 | A | * | 11/1950 | Roberts | ................... | 74/473.33 |
| 2,964,964 | A | * | 12/1960 | Craig | ...................... | 74/473.33 |
| 3,899,934 | A | * | 8/1975 | Froumajou | ........... | 74/473.35 X |
| 4,050,325 | A | * | 9/1977 | Shishido | ................... | 74/473.3 |
| 4,086,822 | A | * | 5/1978 | Kuroda | ................... | 74/473.29 |

* cited by examiner

*Primary Examiner*—Allan D. Herrmann
(74) *Attorney, Agent, or Firm*—Birch, Stewart, Kolasch & Birch, LLP

(57) ABSTRACT

A change lever mechanism for manipulating a change lever, and more particularly to a change lever mechanism of a vehicle constructed and arranged to provide a good shifting feel to a change lever and to absorb vibrations transmitted from engine to thereby prevent transmission of the vibration from a body of the vehicle. The change lever mechanism includes a speed change manipulating unit for providing manipulating power necessary for a driver to change speed when a vehicle is changed in speed, a change lever attachment unit for rotatably supporting the speed change manipulating unit and providing a good shifting feel to the driver, a vibration attenuating unit for attaching the change lever attachment unit to the body of the vehicle so that vibrations transmitted from the engine while the vehicle is running can be absorbed to prevent the vibrations from being conveyed to the change lever, and a manipulating power transmitting unit for transmitting the speed change manipulating power generated by the speed change manipulating unit to the change lever to facilitate shifting.

2 Claims, 4 Drawing Sheets

CHANGE LEVER MECHANISM OF A VEHICLE HAVING VIBRATION ABSORBER

BACKGROUND OF THE INVENTION

1. Field of the invention

The present invention relates to a change lever mechanism for manipulating a change lever, and more particularly to a change lever mechanism of a vehicle constructed and arranged to provide a good shifting feel to a change lever when the change lever is shifted, and to absorb vibration transmitted from the engine to thereby prevent transmission of the vibration to a body of the vehicle.

2. Description of the Prior Art

Generally, a vehicle is equipped with a transmission for transmitting a driving force generated from an engine to an appropriate running state, where the transmission is operated by manipulation of a change lever provided at a driver's seat, particularly a rod-type change lever mechanism of a vehicle mounted with a manual transmission as illustrated in FIG. 1.

In other words, a change lever 1 is mounted thereon with a speed change knob 2 for a driver to hold thereon, where the change lever 1 is made of a hollow member extended lengthwise downwards, and is covered thereunder with a dust cover 3 for preventing entry of foreign objects; a bottom end of lever 1 is pivotally and rotatably secured.

The change lever 1 centrally passes through a ball 4 and is secured to the ball 4 via a pin 5. The ball 4 is accommodated in a housing 6 formed therein with a spherical inner space. The housing 6 has a top opening to accommodate the change lever 1 therein and includes an upper plate 6a to encompass an upper part of the ball 4 at an inner circumferential surface and a lower plate 6b formed to encompass a lower part of the ball 4. Upper and lower plates 6a, 6b are bolted to the vehicle body B.

Furthermore, the change lever 1 is mounted with a shift rod 7 via ball joint 7a for transmitting an operational direction of the change lever 1 to a transmission to allow a speed change to be realized. The housing 6 is arranged at a front side thereof with an extension bar 8 for preventing the so-called Gear Jump-Out phenomenon. Grease is coated on the ball 4 and the housing 6 as lubricant to reduce friction generated therebetween.

When a driver holds the speed change knob 2 to manipulate the change lever 1 back and forward, left and right, manipulating force thereof is transmitted to the transmission via the shift rod 7, such that speed change is realized.

However, there is a problem in the conventional change lever mechanism thus constructed in that teeth in the transmission are unmeshed to generate a Gear Jump-Out phenomenon although the extension bar 8 is mounted between the transmission and the housing 6 when a vehicle runs on a rugged road such as off-road at a sudden acceleration or deceleration, such that vibration of the engine is transmitted to the body of the vehicle via the housing 6 at the transmission mechanism, deteriorating a Noise Vibration Harshness performance of the vehicle and decreasing the shifting feel felt by the driver manipulating the change lever.

There is another problem in that an intermittent contact between the ball 4 and the housing 6 occurs due to vibration of the body B of the vehicle generated by engine operation due to spacing between the ball 4 and the housing 6 which encompasses and supports the ball 4, thereby generating noise between the ball 4 and the housing 6 because of the intermittent contact.

SUMMARY OF THE INVENTION

The present invention solves the aforementioned problems, and it is an object of the present invention to provide a change lever mechanism of a vehicle constructed and arranged to provide a good shifting feel to a change lever while the vehicle is shifted and to absorb the vibration transmitted from the engine preventing transmission of vibration to the body of the vehicle.

In accordance with the objects of the present invention, there is provided a change lever mechanism of a vehicle, the mechanism comprising:

a change lever having a speed change knob thereon and a yoke unit thereunder;

speed change manipulating means formed with a spherical shift ball at a middle portion of the change lever to provide a manipulating force while the change lever is shifted;

change lever attachment means having a hinge axle for rotatably supporting the yoke unit of the change lever, an attachment body for rotatably supporting the hinge axle, and a detent device for supporting the yoke unit with a staccato feel;

vibration attenuating means having a protruder attached to the attachment body via a third attachment unit, a first attachment unit for attaching the attachment body to a vehicle body in vibration-free fashion and a second attachment unit protruding from the first attachment unit for fixing the first attachment unit to the vehicle body; and manipulating force-transmitting means having a cylindrical unit coupled to the shift ball of the change lever for transmitting the speed change manipulating force generated by the speed change manipulating means, and a shift rod coupled to one end of the cylindrical unit.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
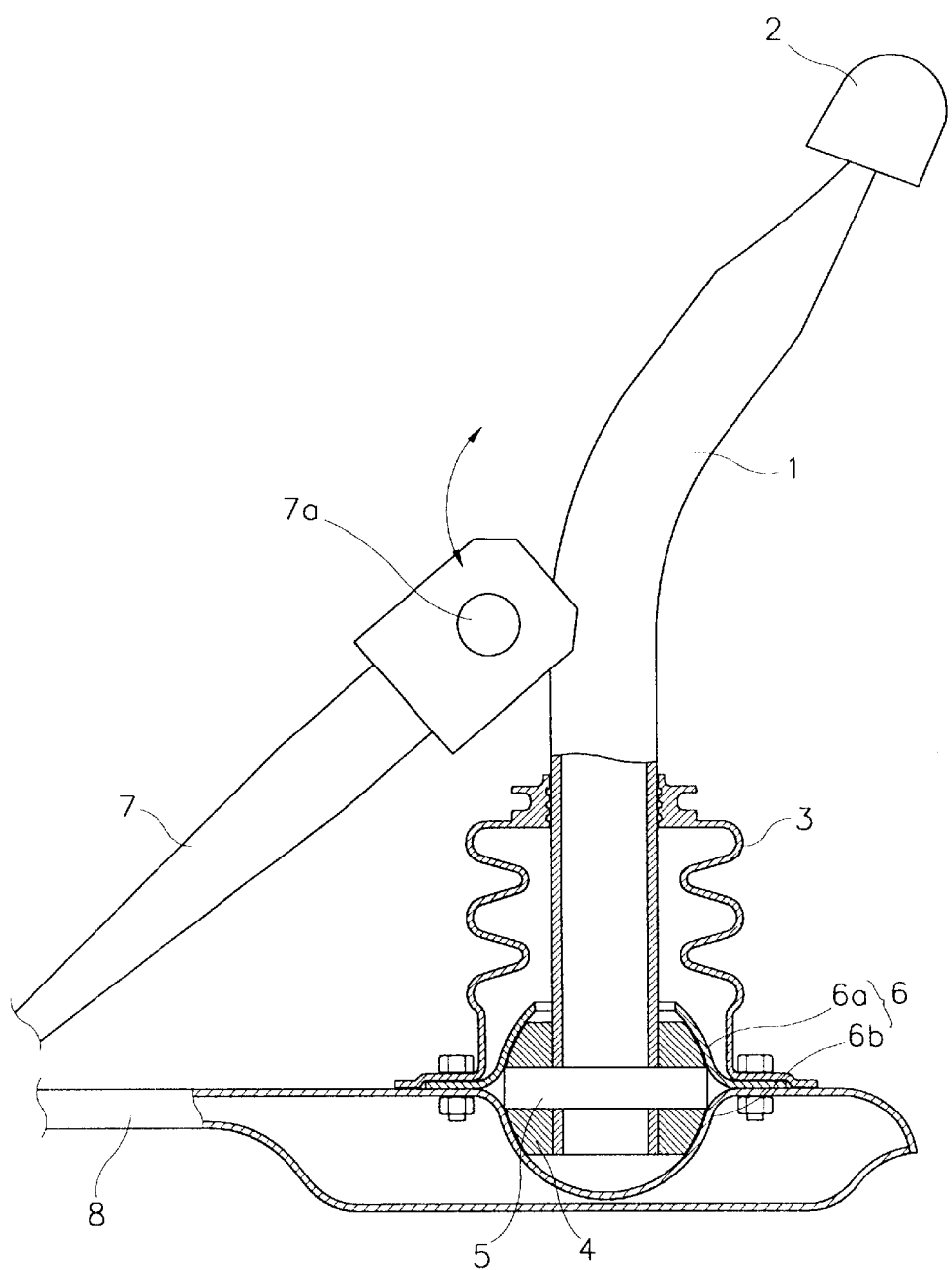
FIG. 1 is a side elevational diagram, partly in section, for illustrating a construction of the conventional change lever mechanism.
Figure 2:
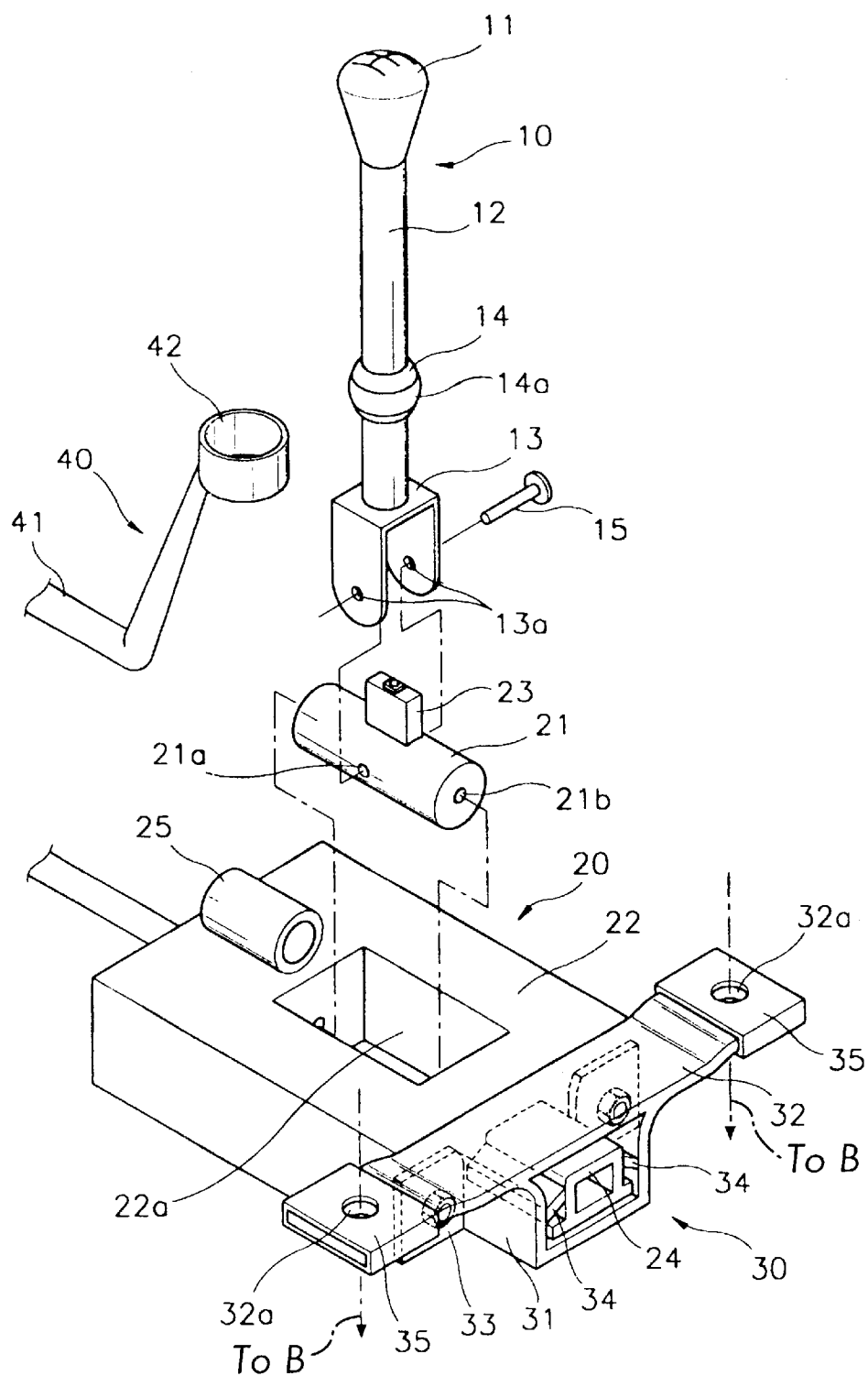
FIG. 2 is an exploded perspective view for illustrating a construction of a change lever mechanism according to the present invention.
Figure 3:
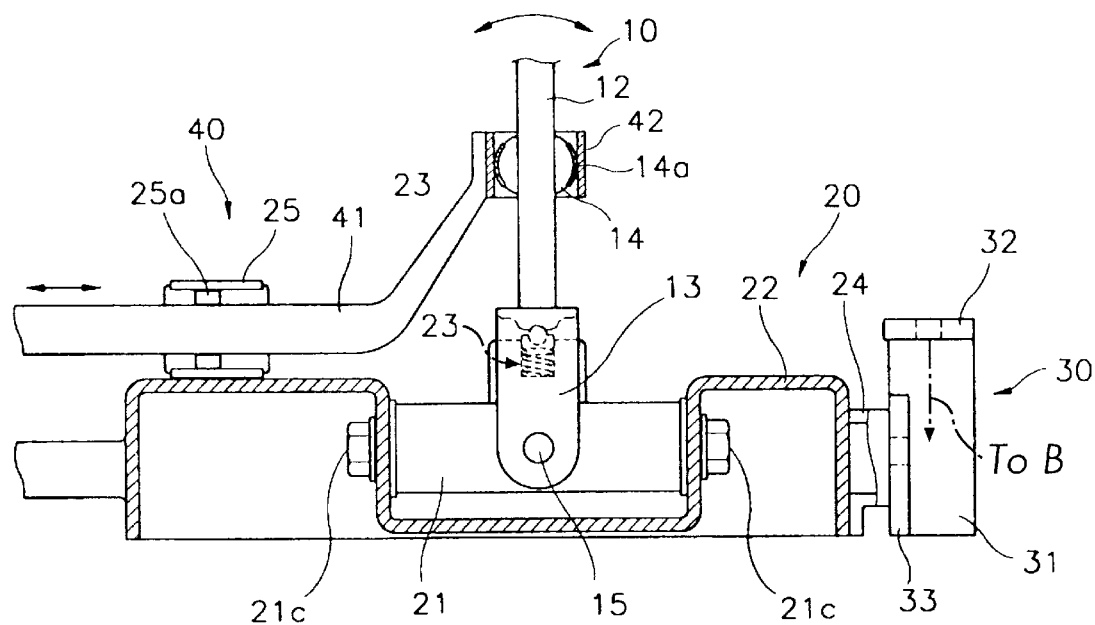
FIG. 3 is a side sectional view for illustrating a construction of a change lever mechanism according to the present invention.

As illustrated in FIGS. 2 and 3, the change lever mechanism includes speed change manipulating means 10 for providing a manipulating power necessary for a driver to change speeds when a vehicle is changed in speed, change lever attachment means 20 for rotatably supporting the speed change manipulating means 10 and providing a good shifting feel to the driver, vibration attenuating means 30 for attaching the change lever attachment means to the body B of the vehicle in a vibration-attenuating method so that the vibration transmitted from the engine while the vehicle is running can be absorbed in the midst thereof to prevent the vibration from being conveyed to the change lever and manipulating power transmitting means 40 for transmitting the speed change manipulating power generated by the speed change manipulating means 10 to the change lever to make it possible to shift.

At this time, the speed change manipulating means 10 includes a change lever 12 for perpendicularly attaching a speed change knob 11 thereon by which a driver can select and manipulate shifting, a yoke unit 13 mounted at a lower end of the change lever 12 having through holes 13a at facing positions, and a spherical shift ball 14 centrally attached to the change lever 12 and integrally coupling a horizontal belt-type cushioning material 14a.

Furthermore, the change lever attachment means 20 includes a hinge axle 21 for rotatably and horizontally supporting the yoke unit 13 of the change lever 12, and an attachment body 22 having an upwardly-opened accommodation cavity 22a for horizontally and rotatably supporting the hinge axle 21, where the hinge axle 21 is horizontally formed with a through hole 21a for being coupled via the through hole 13a at the yoke unit 13 and a coupling pin 15, and is mounted thereon with a detent mechanism 23 for supporting an inner upper surface of the yoke unit 13 in a staccato fashion to give a driver a staccato feel during gear shifting, and the hinge axle 21 is formed with a through hole 21b for coupling the hinge axle 21 lengthwise therethrough to the attachment body 22 for horizontal rotation via a bolt 21c.

Figure 6:
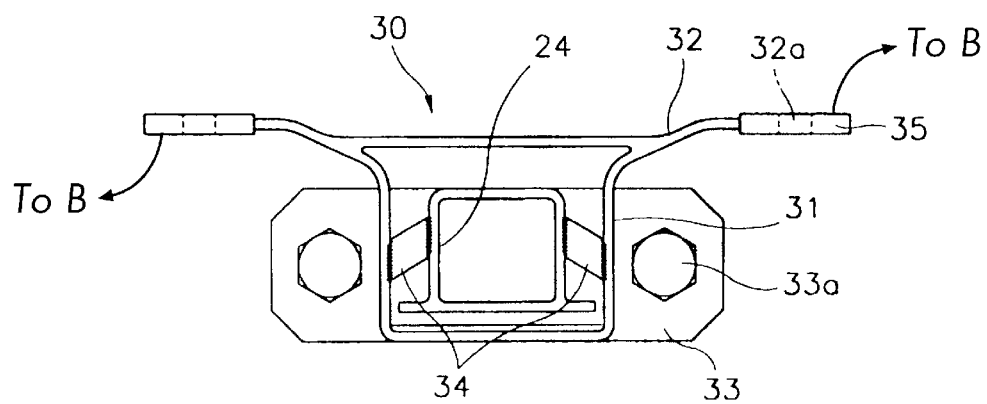
FIG. 6 is a front view of vibration attenuating means shown in FIG. 3.

Furthermore, the vibration attenuating means 30 includes, as illustrated in FIG. 6, a protruder 24 being attached to the attachment body 22 via a third attachment unit 33 which is integrally formed to the protruder and coupled to the attachment body 22 via a bolt 33a, a first attachment unit 31 being coupled to the protruder 24 via cushioning material 34 in order to secure the attachment body 22 in vibration-free fashion and a second attachment unit 32 having a through hole 32a for coupling with a vehicle body B by being externally protruded from the first attachment unit 31 for integral extension, where the cushioning material 34 is vulcanized and attached to an inner surface of the first attachment unit 31 and a periphery of the protruder 24 to secure the protruder 24 to the first attachment unit 31 in vibration-free method, and the second attachment unit 32 is attached by cushioning material 35 for vibration-free coupling with the vehicle body B.

The manipulating power transmitting means 40 is composed of a shift rod 41 having at one tip end thereof a cylindrical unit 42 inserted into a periphery of a shift ball 14 connected at one end to a control link of the transmission and provided at the other end of the change lever 12 of the transmission and provided at the other end of the change lever 12 of the speed change manipulating means 10.

Furthermore, the change lever attachment means 20 is provided at an upper surface thereof of the attachment body 22 with a cylindrical attachment bush 25 for accommodating the shift rod 41 therein and for supporting the same, as illustrated in FIG. 3, where the attachment bush 25 is disposed at an inner circumferential surface thereof with a cushioning material 25a for reducing friction with the shift rod 41.

Figure 4:
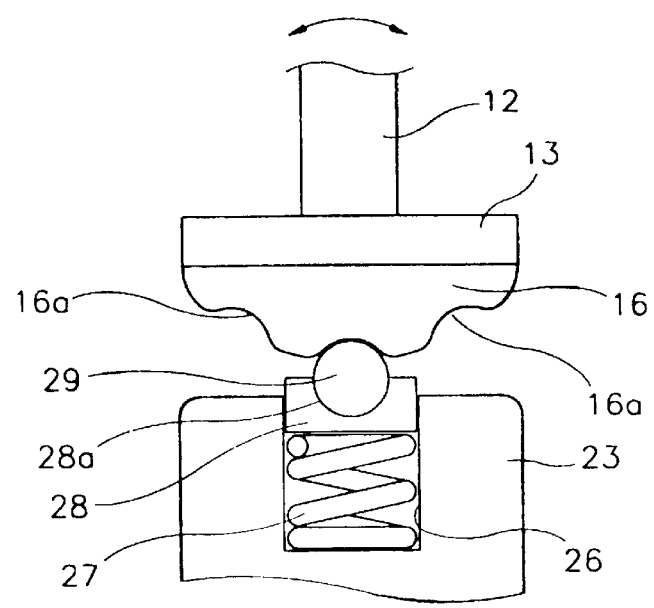
FIG. 4 is a sectional view for illustrating an enlarged detent device shown in FIG. 3.
Figure 5:
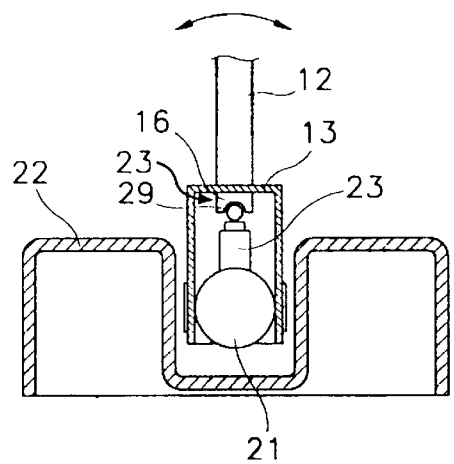
FIG. 5 is a side sectional view for illustrating a detent device shown in FIG. 3.

Meanwhile, the detent device 23 provided at an upper portion of the hinge axle 21 at the change lever attachment means 20 includes, as illustrated in FIGS. 4 and 5, a cavity 26 opened upwards, a movable piece 28 resiliently supported via a spring 27 provided at a bottom surface of the cavity 26 and a detent ball 29 accommodated in a semi-spherical accommodation groove 28a formed in the top surface of the movable piece 28.

The yoke unit 13 arranged underneath the change lever 12 of the speed change manipulating means 10 is formed at an inner, upper surface thereof with a detent unit 16 formed with a plurality of semi-spherical detent grooves 16a for accommodating the detent ball 29.

In the change lever mechanism according to the present invention thus constructed, when the change lever 12 at the speed change manipulating means 10 is selectively manipulated to the left/right directions, the yoke unit 13 underneath the change lever 12 is rotated to the left and right directions via the hinge axle 21 hinged to the accommodating unit on the attachment body 22, at which time, the yoke unit 13 at a lower lever of the change lever 12 contacts a lateral wall of the accommodating unit 22a at the attachment body 22 to receive a restraint in rotation to the left and right directions.

When the change lever 12 is shifted back and forth, the yoke unit 13 at the change lever 12 is rotated back and forth on the hinge axle 21 via coupling pin 15, at which time, the detent unit 16 on the yoke unit 13 at the change lever 12 touches the detent ball 29 of the detent device 23 at the change lever attachment means 20 in a staccato feel, such that the driver can feel the staccato feel in shifting and unmesh of the teeth generated by rolling vibration of the engine can be prevented through a coupling force between the detent unit 16 and the detent ball 29.

When the change lever 12 is selectively shifted as mentioned above, the manipulating power transmitting means 40 is moved back and forth to selectively perform meshing between teeth of the transmission, at which time, cylindrical unit 42 at the shift rod 41 soft contacts the shift ball 14 at the change lever 12 to transmit the manipulating power of the change lever 12 to the shift rod 41.

Furthermore, the attachment bush 25 secured at the attachment body 22 smoothly guides the movement of the shift rod 41.

Meanwhile, vibration transmitted through the shift rod 41 is initially reduced by the cushioning material 14a attached to a periphery of the shift ball 14 at the change lever 12 and by another cushioning material 34 vulcanized and adhered between the first attachment unit 31 and the protruder 24 connected to the attachment body 22 and again by the cushioning material 35 inserted into the second attachment unit 32.

Furthermore, when the shift ball 14, hinge axle 21 and the vibration attenuating means 30 at the change lever mechanism are manufactured of plastic material, an effect of reducing weight of parts can be expected.

As apparent from the foregoing, there is an advantage in the change lever mechanism of vehicle according to the present invention in that speed change manipulating means is mounted on change lever attachment means via a detent device and the change lever attachment means is secured to the body of the vehicle via vibration attenuating means, such that a driver can be provided a staccato feel in shifting and vibration transmitted from the engine is cut off to thereby promote a normal function of the change lever and a good soft shifting feel while the vehicle is shifted.

What is claimed is:

1. A change lever mechanism of a vehicle, the mechanism comprising:

a change lever having a speed change knob thereon and a yoke unit thereunder;

speed change manipulating means formed with a spherical shift ball at a middle portion of the change lever to provide a manipulating force while the change lever is shifted;

change lever attachment means having a hinge axle for rotatably supporting the yoke unit of the change lever, an attachment body for rotatably supporting the hinge axle, and a detent device for supporting the yoke unit with a staccato feel;

vibration attenuating means having a protruder attached to the attachment body via a third attachment unit, a first attachment unit for attaching the attachment body to a vehicle body in vibration-free fashion and a second attachment unit protruding from the first attachment unit for fixing the first attachment unit to the vehicle body; and manipulating force transmitting means having a cylindrical unit coupled to the shift ball of the change lever for transmitting the speed change manipulating force generated by the speed change manipulating means, and a shift rod coupled to one end of the cylindrical unit.

2. The mechanism as defined in claim 1, wherein the detent device comprises:

an upwardly opening cavity;

a movable piece resiliently supported via a spring provided at a bottom surface of the cavity; and a detent ball accommodated in a semi-spherical accommodation groove formed in the movable piece, wherein the yoke unit is formed at an inner upper surface thereof with a detent unit formed with a plurality of semi-spherical detent grooves for accommodating the detent ball.

* * * * *